United States Patent
Chae et al.

(10) Patent No.: US 10,433,294 B2
(45) Date of Patent: Oct. 1, 2019

(54) METHOD AND DEVICE FOR TRANSMITTING/RECEIVING SIGNAL OF V2X TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,877

(22) PCT Filed: Aug. 22, 2016

(86) PCT No.: PCT/KR2016/009251
§ 371 (c)(1),
(2) Date: Feb. 20, 2018

(87) PCT Pub. No.: WO2017/034265
PCT Pub. Date: Mar. 2, 2017

(65) Prior Publication Data
US 2018/0242287 A1  Aug. 23, 2018

Related U.S. Application Data

(60) Provisional application No. 62/207,930, filed on Aug. 21, 2015, provisional application No. 62/322,229, filed on Apr. 13, 2016.

(51) Int. Cl.
*H04W 72/04* (2009.01)
*H04J 13/00* (2011.01)
(Continued)

(52) U.S. Cl.
CPC .......... *H04W 72/042* (2013.01); *H04J 13/00* (2013.01); *H04J 13/0062* (2013.01);
(Continued)

(58) Field of Classification Search
CPC ... H04W 72/042; H04W 56/001; H04W 4/40; H04W 4/70; H04W 56/00; H04L 5/0048;
(Continued)

(56) References Cited

U.S. PATENT DOCUMENTS

| 2013/0136093 | A1 | 5/2013 | Han |
| 2017/0048917 | A1* | 2/2017 | Kim ...................... H04L 5/0048 |
| 2018/0199298 | A1* | 7/2018 | Wakabayashi .... H04W 56/0015 |

FOREIGN PATENT DOCUMENTS

| WO | WO 2011/084004 A2 | 7/2011 |
| WO | WO 2015/065014 A1 | 5/2015 |
| WO | WO 2015/115804 A1 | 8/2015 |

OTHER PUBLICATIONS

LG Electronics, "Discussion on the deployment scenarios of V2X evaluation methodology," 3GPP TSG RAN WG1 Meeting #82, R1-154288, Beijing, China, Aug. 24-28, 2015, pp. 1-9.
(Continued)

*Primary Examiner* — Jae Y Lee
(74) *Attorney, Agent, or Firm* — Birch, Stewart, Kolasch & Birch, LLP

(57) ABSTRACT

In one embodiment of the present invention, a method by which a terminal transmits a signal in a wireless communication system comprises the steps of: generating a sequence having a length of 63 and having a punctured central element; inserting one or more zeros among respective elements of the sequence and mapping the sequence to RE; and transmitting the mapped sequence, wherein the number of one or more zeros inserted among the respective elements of the sequence corresponds to (a repetition factor—1), and zeros are additionally inserted such that the sequence is
(Continued)

symmetrical with respect to the central element of the sequence, when the repetition factor is an even number.

2 Claims, 15 Drawing Sheets

(51) Int. Cl.
    *H04W 56/00* (2009.01)
    *H04W 4/70* (2018.01)
    *H04W 4/40* (2018.01)
    *H04L 5/00* (2006.01)
    *H04L 27/26* (2006.01)
    *H04J 11/00* (2006.01)

(52) U.S. Cl.
    CPC ........ *H04L 5/0048* (2013.01); *H04L 27/2611* (2013.01); *H04L 27/2613* (2013.01); *H04W 4/40* (2018.02); *H04W 4/70* (2018.02); *H04W 56/00* (2013.01); *H04W 56/001* (2013.01); H04J 11/0069 (2013.01); *H04J 2013/0096* (2013.01)

(58) Field of Classification Search
    CPC ........ H04J 13/0062; H04J 11/00; H04J 13/00; H04J 2013/0096
    See application file for complete search history.

(56) References Cited

OTHER PUBLICATIONS

Huawei et al., "Motivation for RAN Work on V2V in Rel-13", 3GPP TSG RAN Meeting #66, RP-141918, Maui, USA, Dec. 8-11, 2014, 8 pages.

LG Electronics, "Remaining Details of Sidelink Synchronization", 3GPP TSG RAN WG1 Meeting #86, R1-166833, Gothenburg, Sweden, Aug. 22-26, 2016, 6 pages.

* cited by examiner

FIG. 5
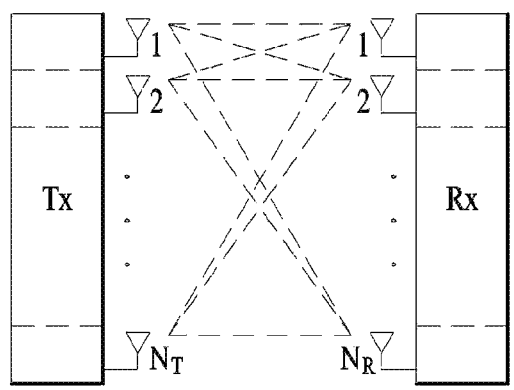
(a)
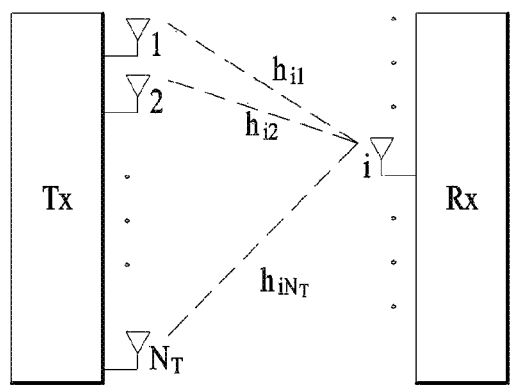
(b)

FIG. 8
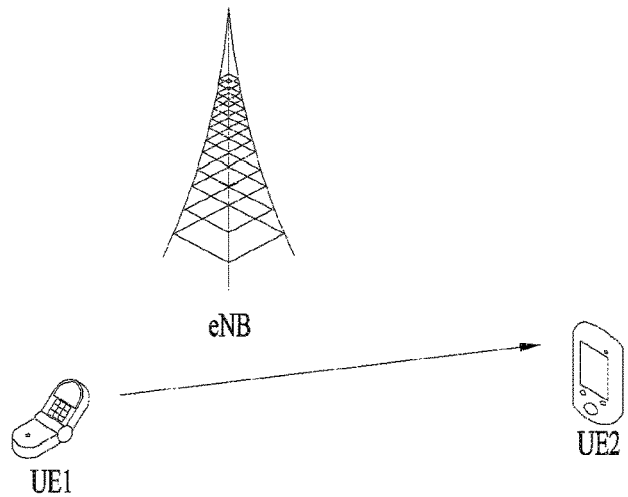
(a)
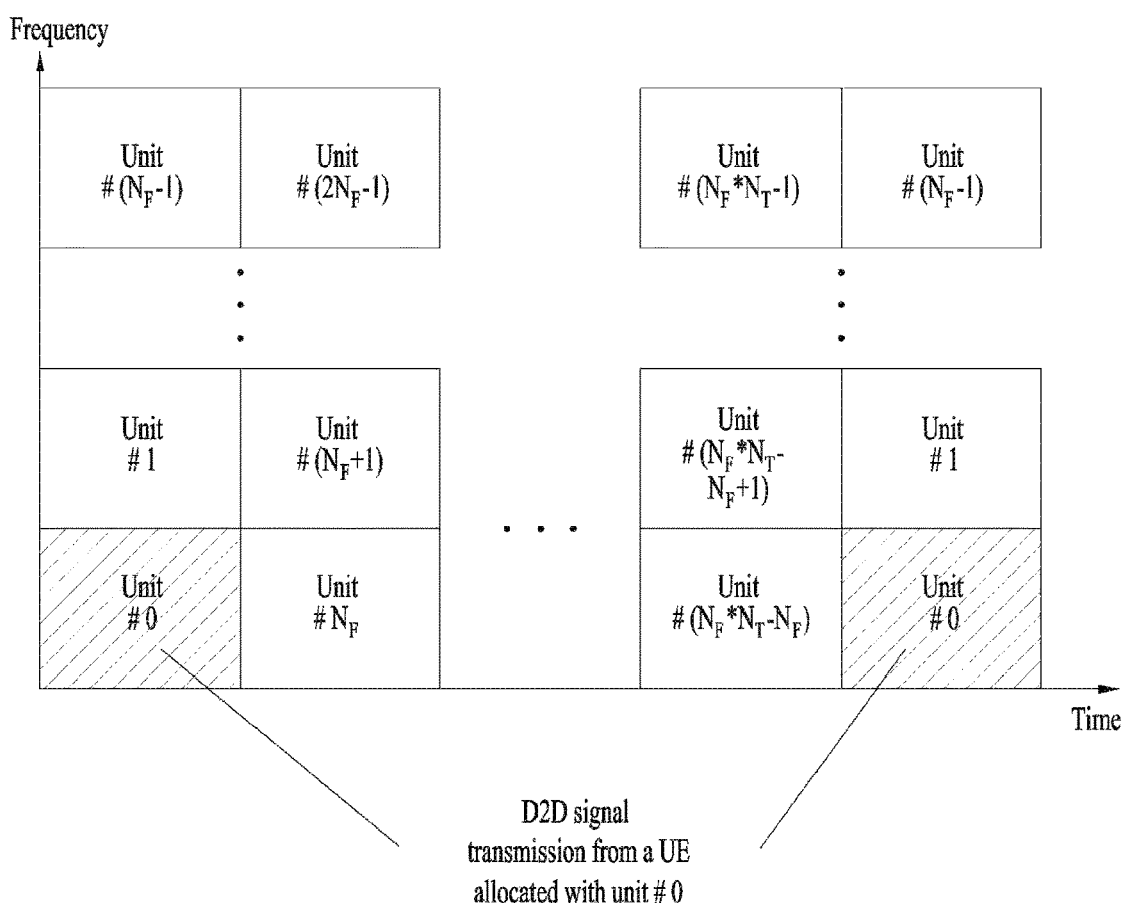
(b)

FIG. 10
Case 1
Comb
repetition
factor = 2
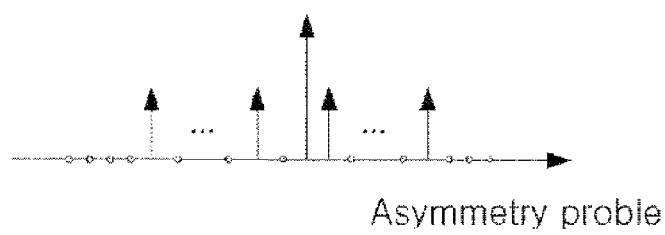
Asymmetry problem
Case 2
Comb
repetition
factor = 2
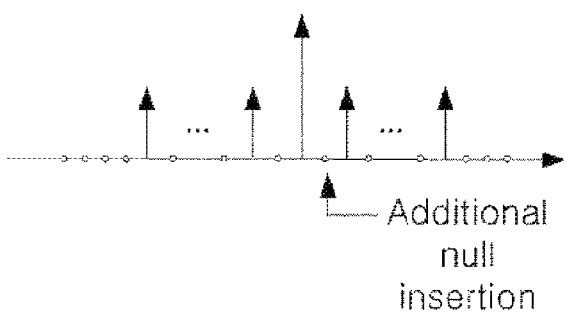
Additional null insertion FIG. 12
Case 1
Comb
repetition
factor = 3
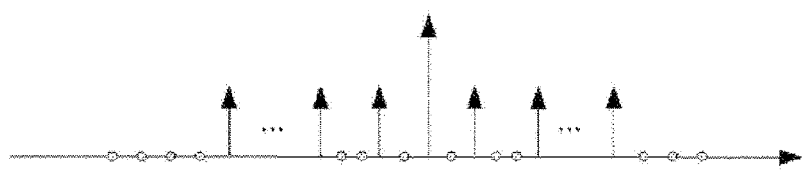
Case 2
Comb
repetition
factor = 3
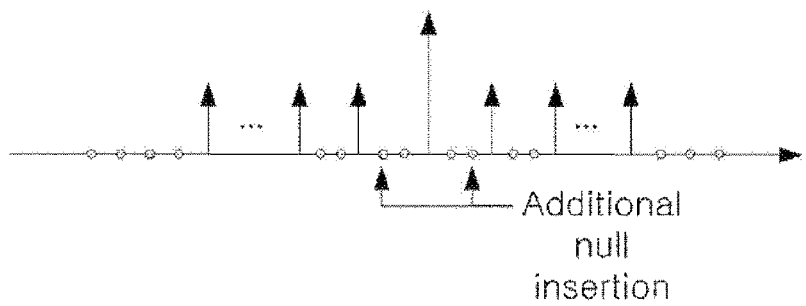
Additional null insertion FIG. 13
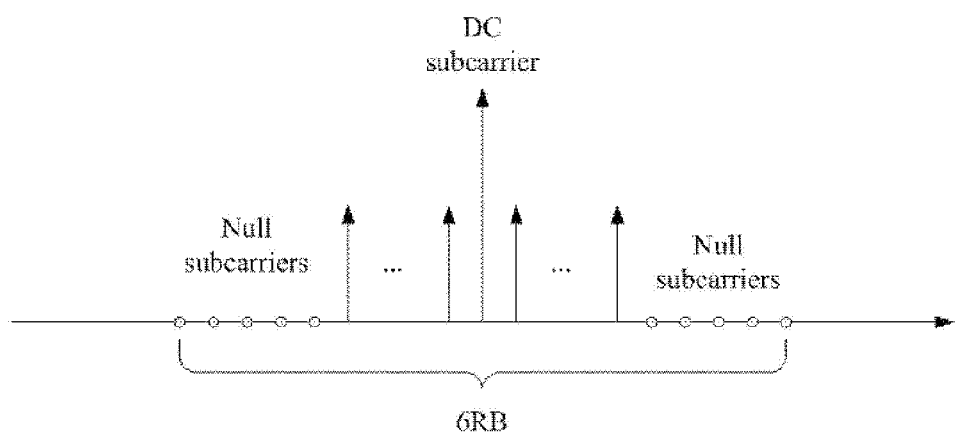
(a)
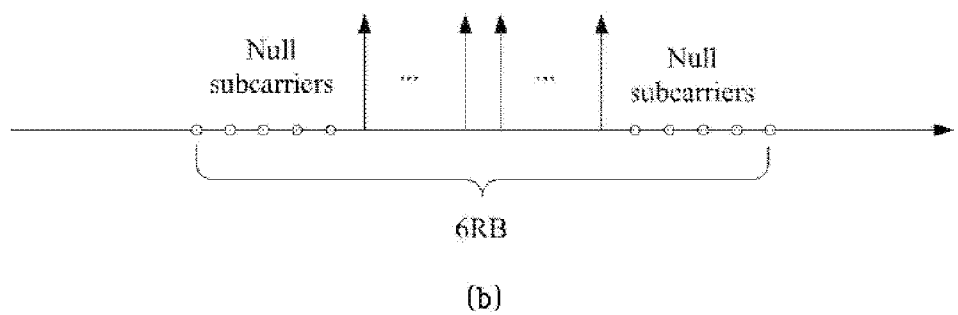
(b)

FIG. 14
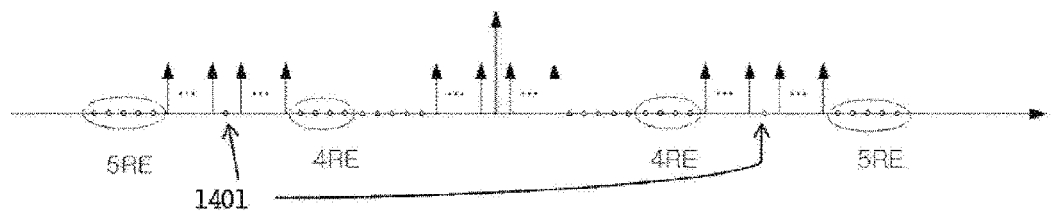
(a)
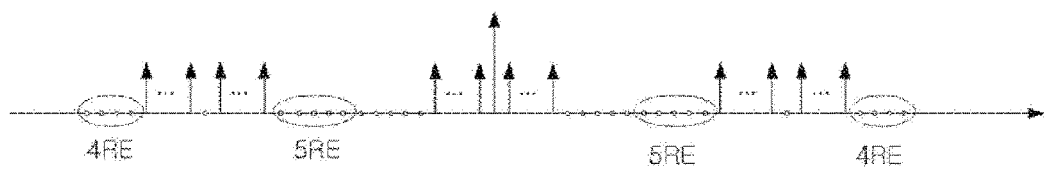
(b)

METHOD AND DEVICE FOR TRANSMITTING/RECEIVING SIGNAL OF V2X TERMINAL IN WIRELESS COMMUNICATION SYSTEM

CROSS REFERENCE TO RELATED APPLICATIONS

This application is the National Phase of PCT International Application No. PCT/KR2016/009251, filed on Aug. 22, 2016, which claims priority under 35 U.S.C. 119(e) to U.S. Provisional Application No. 62/207,930, filed on Aug. 21, 2015 and 62/322,229, filed on Apr. 13, 2016, all of which are hereby expressly incorporated by reference into the present application.

TECHNICAL FIELD

Following description relates to a wireless communication system, and more particularly, to a method of generating/mapping/transmitting a sequence effective to big frequency offset environment and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

A technical task of the present invention is to provide a method of generating/mapping/transmitting a synchronization signal in environment where a frequency offset is big.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by a user equipment (UE) in a wireless communication system, includes the steps of generating a sequence of a length of 63 of which the center element of the sequence is punctured, inserting one or more 0s between elements of the sequence and mapping the sequence to an RE, and transmitting the mapped sequence. In this case, the number of the one or more 0s inserted between the elements of the sequence corresponds to (repetition factor−1) and if the repetition factor corresponds to an even number, 0s can be additionally inserted to make symmetry on the basis of the center element of the sequence.

To further achieve these and other advantages and in accordance with the purpose of the present invention, according to a different embodiment, a user equipment (UE) transmitting a signal in a wireless communication system includes a transmitter and a receiver, and a processor, the processor configured to insert one or more 0s between elements of a sequence and map the sequence to an RE, the processor configured to transmit the mapped sequence. In this case, the number of the one or more 0s inserted between the elements of the sequence corresponds to (repetition factor—1) and if the repetition factor corresponds to an even number, 0s can be additionally inserted to make symmetry on the basis of the center element of the sequence.

The number of additionally inserted 0s may correspond to (repetition factor—1).

0s can be additionally inserted to make symmetry on the basis of the center element of the sequence even when the repetition factor corresponds to an odd number.

The sequence may indicate that a UE, which has transmitted the sequence, corresponds to an LTE UE.

The sequence can enable a V2X UE, which has received the sequence, to obtain synchronization.

The sequence may correspond to either a Zadoff-Chu sequence or an m-sequence.

The repetition factor may vary depending on whether the sequence corresponds to the Zadoff-Chu sequence or the m-sequence.

The repetition factor may be proportional to a moving speed of the UE.

The repetition factor can be configured by an RSU.

The repetition factor can be configured according to a frequency of a carrier on which the sequence is transmitted.

The repetition factor can be configured according to whether or not a UE receiving the sequence is connected to a GPS.

Advantageous Effects

According to the present invention, it is able to efficiently obtain synchronization even when a frequency offset is big.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

FIGS. 10 to 14 are diagrams for explaining a method of generating/mapping a sequence according to each of embodiments of the present invention;

BEST MODE

Mode for Invention

Figure 1:
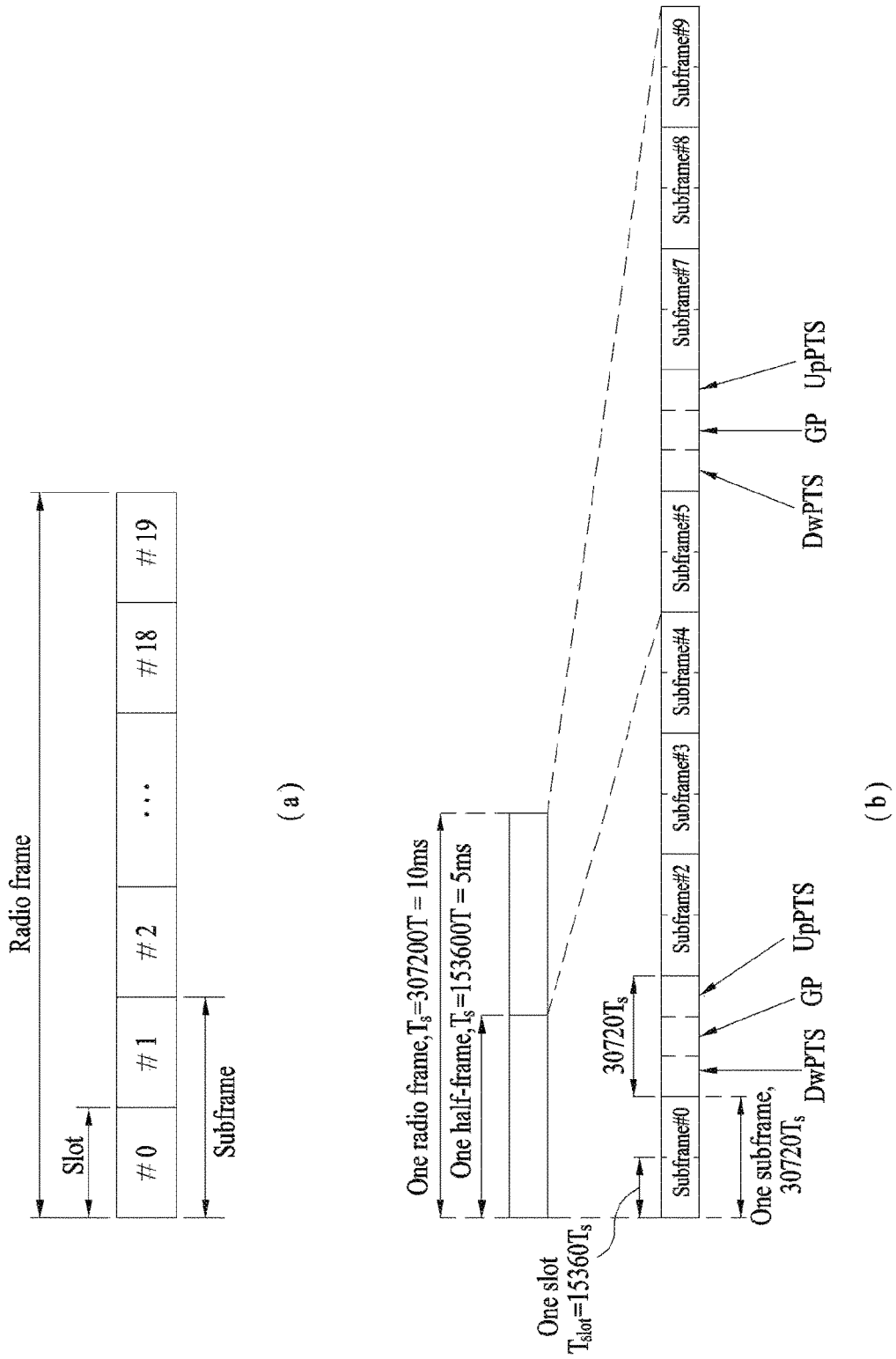
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
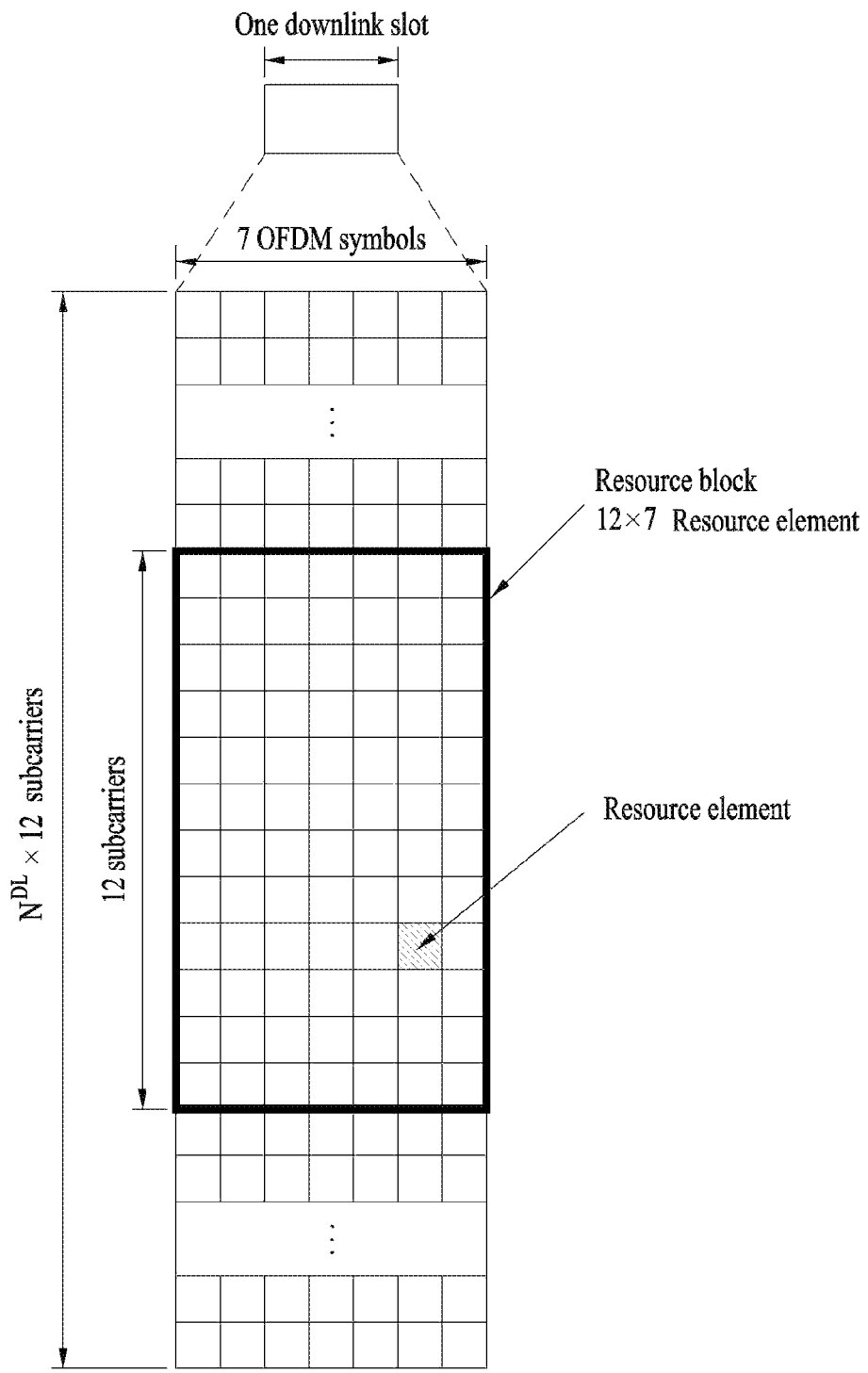
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
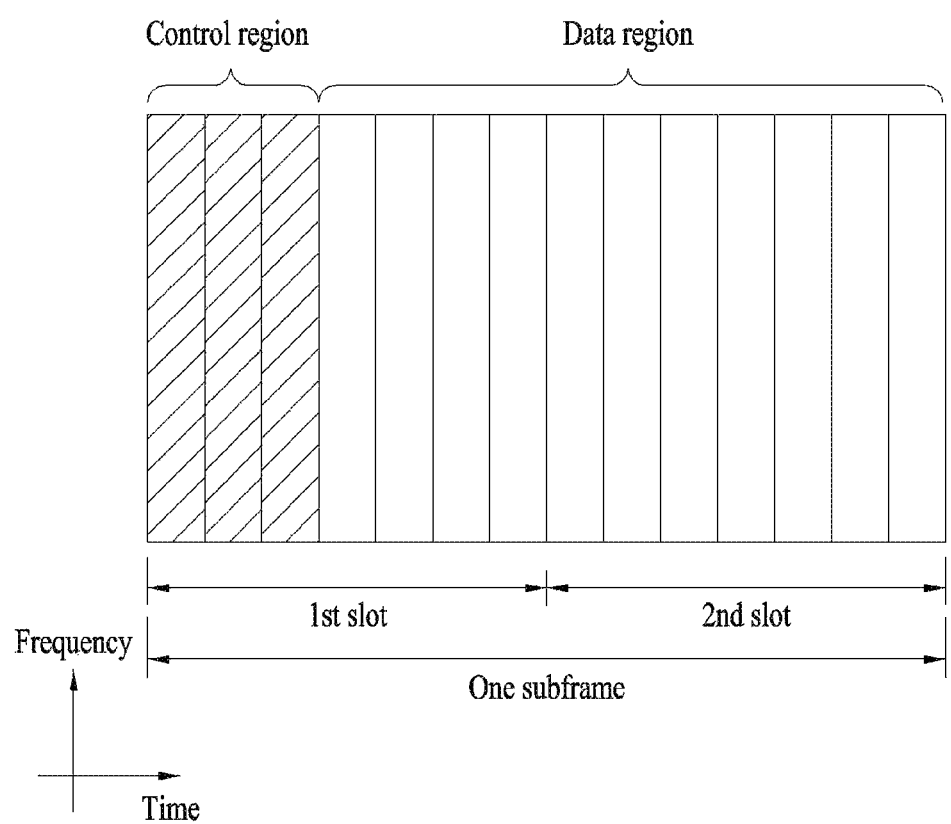
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
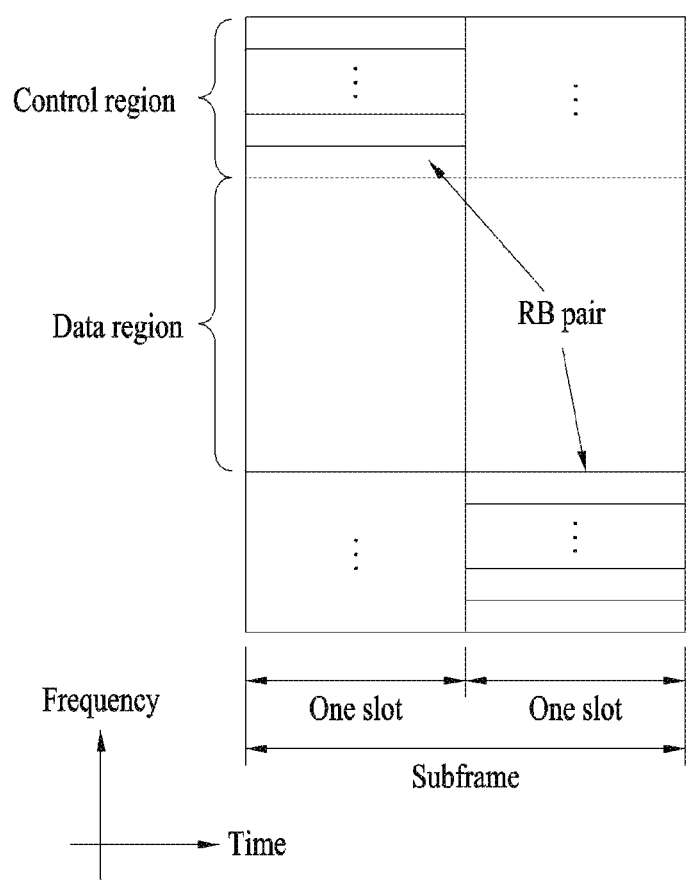
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [S_1, S_2, \ldots, S_{N_T}]^T \quad \text{[Equation 2]}$$

Meanwhile, transmit powers can be set different from each other for individual pieces of transmission information $S_1, S_2, \ldots, S_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
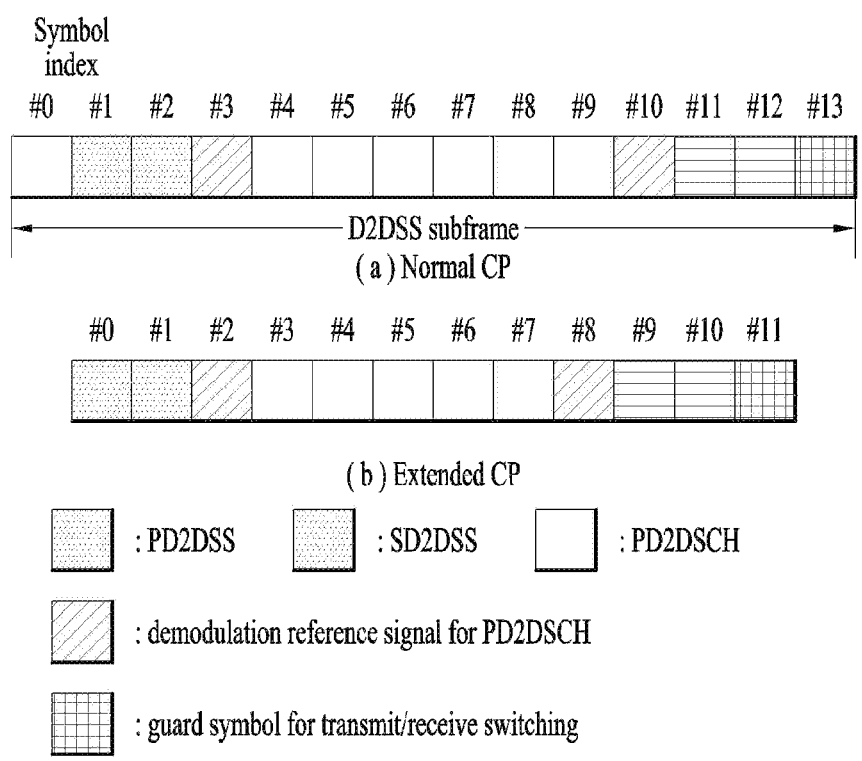
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
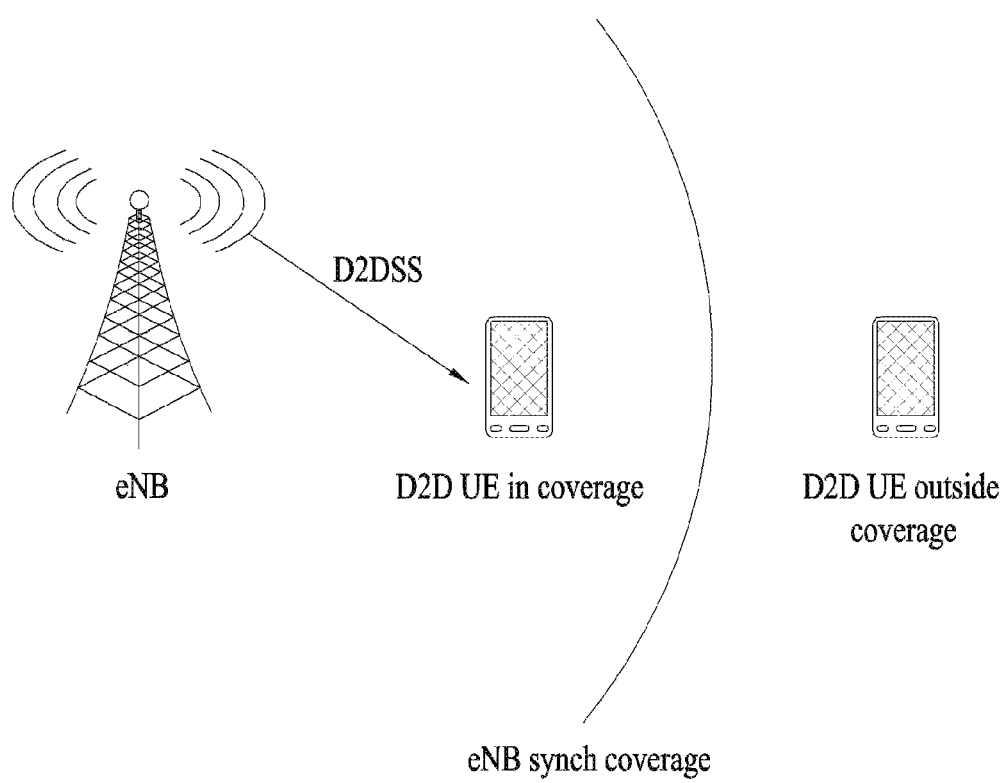
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
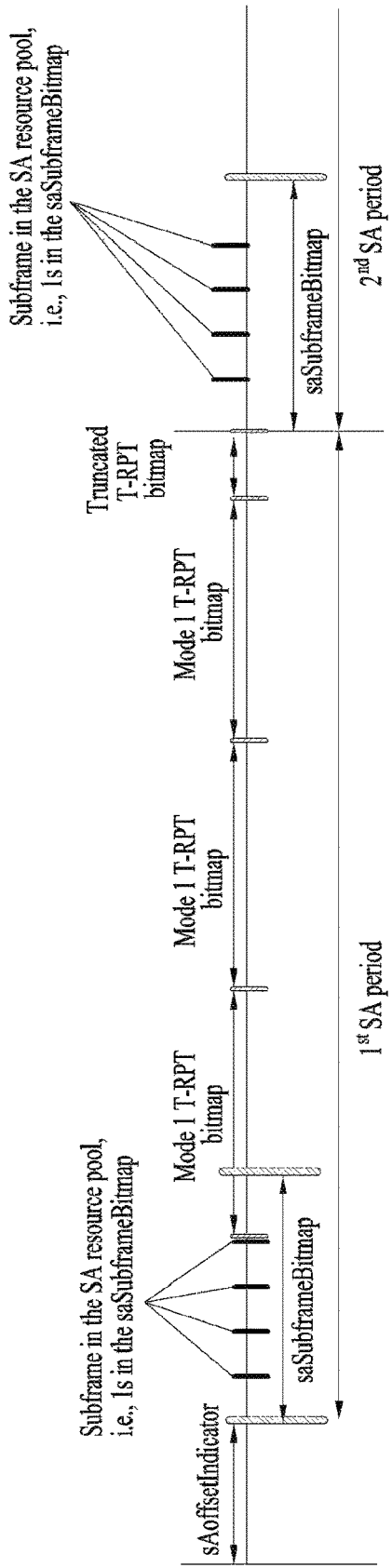
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission terminal performs transmission at a position of which a T-RPT bitmap corresponds to 1 in an indicated T-RPT. One MAC PDU performs transmission four times.

In the aforementioned V2V communication corresponding to communication performed between vehicle terminals, it may use 5.9 GHz band. A frequency offset may considerably occur in a high frequency band such as 5.9 GHz and the like. Moreover, since mobility is high due to the characteristic of a vehicle, it is highly probable that a frequency error occurs due to the Doppler shift. In particular, in case of performing the V2V communication, due to the specificity of communication environment of the V2V communication, it may be difficult to guarantee synchronization performance of an optimum level. Hence, a method of generating and/or transmitting a synchronization signal capable of showing good performance even in such communication environment as a high carrier frequency, high mobility, and the like. In the following description, a synchronization signal for V2V, V2X, and the like is commonly referred to as a V-SS. Although a method of generating/transmitting the V-SS is explained centering on a UE, the method can also be applied to a V-SS generated/transmitted by a base station. An SSSS (m-sequence based sequence) transmitted by a V-UE and a PSSS (Zadoff-Chu based sequence) are referred to as a VSSS (vehicle secondary synchronization signal) and a VPSS (vehicle primary synchronization signal), respectively.

Embodiment 1

A first embodiment is to transmit a sequence with subcarrier spacing selected from among 1, 2, 4, 8, and 16 multiples of 15 kHz (i.e., 15 KHz, 30 KHz, 60 KHz, 120 KHz, and 240 KHz) in frequency domain. The first embodiment can be comprehended as a scheme of transmitting an SLSS (PSSS and/or SSSS) of legacy 6 RBs by configuring the SLSS with a comb repetition factor 2, 4, 6, or 16. Yet, a value of the repetition factor is just an example. The comb repetition factor is not restricted to a square of 2. It may also use a repetition factor of a natural number.

Specifically, the abovementioned method can be implemented in a manner that a NULL subcarrier is inserted between sequences (elements) (of an SLSS). In frequency domain, if a NULL subcarrier is inserted between sequence elements, it may have an effect that subcarrier spacing is effectively widened. In this case, a form of inserting the NULL subcarrier may vary depending on whether a waveform used for V-SS corresponds to OFDM or SC-FDM. And, the form of inserting the NULL subcarrier may vary depending on a repetition factor. In case of using the SC-FDM, since there is no DC subcarrier, NULL can be evenly filled for a comb patterned. On the contrary, in case of using the OFDM, since there is a DC subcarrier, if a NULL subcarrier is simply inserted between elements of a sequence, the elements become asymmetrical on the basis of the DC. As a result, it is unable to use a legacy detector. In order to solve the problem, it may use a method of generating and/or transmitting a (synchronization) sequence described in the following. For example, in case of using an OFDM waveform, a synchronization signal to RE mapping method of a comb type can be expressed by an equation described in the following.

$$a_{k,l} = d(n), \quad n = 0, \ldots, 30 \quad \text{[Equation 12]}$$
$$k = n - 31 + \frac{N_{RB}^{DL} N_{sc}^{RB}}{2}$$
$$a_{k,l} = d(n), \quad n = 31, \ldots, 62$$
$$k = n - 30 + \frac{N_{RB}^{DL} N_{sc}^{RB}}{2}$$

In equation 12, d(n) corresponds to a sequence described in the following, $a_{k,l}$ corresponds to an RE to which the sequence is mapped, $N_{RB}^{DL}$ corresponds to a downlink bandwidth, and $N_{sc}^{RB}$ corresponds to an RB size of a subcarrier unit.

A base station or a UE generates a sequence of a length of 63 of which the center of the sequence is punctured (or, a sequence to which a null is inserted), inserts one or more 0s between elements of the sequence, maps the sequence to an RE, and transmits the mapped sequence. In this case, the number of one or more 0s inserted between elements of the sequence corresponds to (repetition factor—1). If the repetition factor corresponds to an even number, it may be able to additionally insert 0s to make symmetry on the basis of the center element (i.e., DC subcarrier) of the sequence. In this case, the number of additionally inserted 0s may correspond to (repetition factor—1). The abovementioned method of generating and mapping the sequence can also be performed using a method described in the following. The base station or the UE generates a first sequence of a length of 63 of which the center of the sequence is punctured (or, a sequence to which a null is inserted) and may be able to generate a second sequence by inserting one or more 0s between elements of the sequence. In this case, the number of one or more 0s inserted between elements of the first sequence corresponds to (repetition factor—1). If the repetition factor corresponds to an even number, it may be able to additionally insert 0s to make symmetry on the basis of the center element (i.e., DC subcarrier) of the first sequence. In this case, the number of additionally inserted 0s may correspond to (repetition factor—1). The base station or the UE maps the generated second sequence to an RE and may be able to transmit the mapped sequence.

Figure 11:
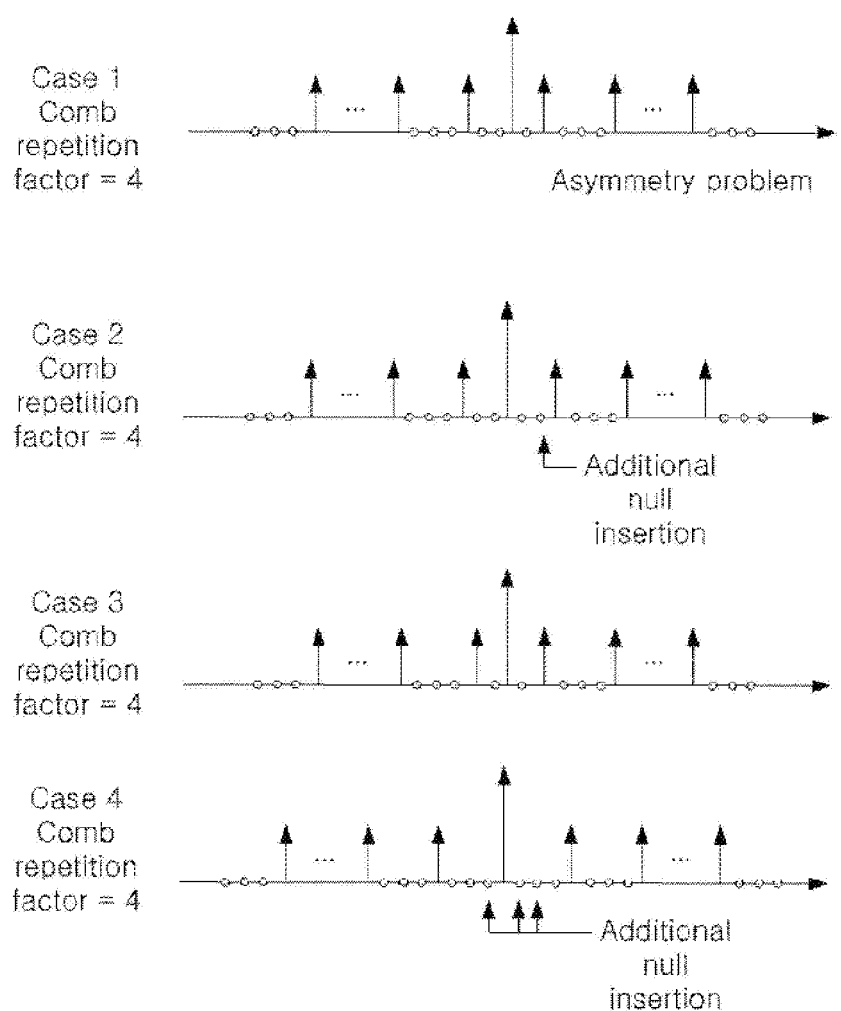

FIG. 10 illustrates a case of simply inserting 0s when a repetition factor corresponds to 2 (case 1) and a case of additionally inserting 0s on the basis of a DC subcarrier (case 2). FIG. 11 illustrates examples when a repetition count corresponds to 4. Specifically, when 0s are simply inserted (case 1), it may add a NULL subcarrier to a position near DC (case 2). If a NULL subcarrier is removed (case 3), it may add NULLs as many as (repetition factor—1) to a position near DC (case 4). In each of the cases, if the number of additionally inserted 0s corresponds to (repetition factor—1), in particular, if 3 0s are additionally inserted, it may be able to maintain the same interval spacing between subcarriers to which a sequence is mapped while symmetrical characteristic is maintained on the basis of a DC subcarrier. If the same interval is maintained between subcarriers to which the sequence is mapped, it may be able to overcome a demerit incapable of using a legacy PSS detector in the cases 2 and 3.

When a repetition factor corresponds to an odd number, it may also be able to additionally insert 0s to make symmetry on the basis of the center element of a sequence. If the repetition factor corresponds to the odd number, it may simply insert the (repletion factor—1) number of 0s between elements of the sequence. In this case, in order to maintain the time domain characteristic of a legacy PSS, it may add NULL to a position near a DC subcarrier. FIG. 12 illustrates an example of the abovementioned method.

Meanwhile, if it is unable to reuse a legacy PSS detector, it can be comprehended as a sequence form distinguished from a PSS. Hence, if it is designed to distinguish the PSS from V-SS, it can be utilized as a merit rather than a demerit. In particular, if a time domain sequence of a form different from a form of the PSS is intentionally generated, the time domain sequence can be distinguished from the legacy PSS. In this case, a repetition factor of a PSSS can be configured in a manner of being different from a repetition factor of an SSSS. (If the SSSS is transmitted from the V-SS), when an ID of a synchronization source is identified using the SSSS after time/frequency synchronization is matched via the PSSS, a size of frequency domain occupied by the SSSS can be reduced to use an RE in transmitting other data. If a sequence identical to the legacy SLSS is transmitted using a repetition factor equal to or greater than 2, a legacy SLSS sequence appears in a repeated form in time domain. If the legacy SLSS is transmitted during 6 RBs, as a repetition factor (x) is getting bigger, a bandwidth on which a synchronization for V2X is transmitted may become 6*RB. According to the abovementioned method, since it is able to repetitively implement an SLSS used in legacy D2D in time domain, it may be able to reduce implementation complexity in a legacy UE. Moreover, since it is able to have wide subcarrier spacing in frequency domain, it is able to detect a synchronization signal even when there is a high frequency error. Since it is able to have a form that the same sequences are repeated in one OFDM symbol, the same sequences can estimate a high frequency error in the symbol via correlation when a frequency offset occurs.

Embodiment 2

A second embodiment is to repetitively configure a sequence in frequency domain. The number of repeating frequency domain can be determined in advance or can be signaled using one of methods defined in legacy LTE. FIG. 13 (*a*) illustrates a case of mapping a sequence in OFDM and FIG. 13 (*b*) illustrates a case of mapping a sequence in SC-FDM. In case of the SC-FDM, since there is no DC subcarrier, the number of subcarriers corresponds to 62. In case of the OFDM, 63 subcarriers (including DC) are effectively occupied. In case of using the OFDM scheme, it is necessary for a signal repeated in frequency domain to satisfy two properties including left/right symmetry on the basis of a DC subcarrier and repetition of the same sequence in frequency domain. In this case, a synchronization signal repeated in frequency domain may have a form that 0 is padded between samples in the domain. This can be usefully used for estimating a timing offset in time domain.

In order to satisfy the two properties, it is necessary to delicately adjust a NULL subcarrier position on the basis of DC in the OFDM-based scheme. Specifically, as shown in FIG. 14 (*a*), when a synchronization signal is repeated in frequency domain, a sequence repeated in the left side on the basis of DC deploys a guard RE of 4 REs to a close side on the basis of DC, deploys a guard RE of 5 REs to a far side on the basis of the DC, and deploys a NULL RE to the center of the sequence (original DC position). Or, as shown in FIG. 14 (*b*), when a synchronization signal is repeated in frequency domain, a sequence repeated in the left side on the basis of DC deploys a guard RE of 5 REs to a close side on the basis of DC, deploys a guard RE of 4 REs to a far side on the basis of the DC, and deploys a NULL RE to the center of the sequence (original DC position). In the abovementioned two methods, although it is able to insert NULL (zero gain) to an RE (a NULL subcarrier 1410 positioned at the center of the repeated sequence in FIG. 14) positioned at the original DC position of the repeated sequence, the RE can also be filled with a unit gain (1) or a gain assigned to a DC subcarrier.

In case of using a waveform of the SC FDM, since there is no DC, the same sequence (left/right 5 NULL REs) can be repeated in frequency domain.

In the aforementioned method, a repetition count of a PSS constructing a V-SS may be different from a repetition count of an SSS. The repetition count can be determined in advance or can be configured by a network. Or, when a specific condition is satisfied by a UE, a repetition count of frequency domain can be determined and transmitted/received. If the repetition count is configured by the network or is determined by the UE, it may use all or a part of methods described in the following. In the meantime, the embodiment 2 can be used in a manner of being independent from the embodiment 1. Or, the embodiment 2 can be used together with the embodiment 1. In particular, when repetition is performed in frequency domain, the repetition can be performed in a manner of being extended to a comb form.

In the embodiment 1 and the embodiment 2, a sequence may correspond to either a Zadoff-Chu sequence or an m-sequence. In particular, the sequence may correspond to a sequence for a PSS or a sequence for an SSS in legacy LTE. Or, the sequence may correspond to an SLSS sequence. In particular, a sequence can be used for acquiring synchronization by a V2X terminal which has received the sequence.

Although it is able to use the abovementioned description for V2X, the description can also be used for transmitting a wideband preamble or a synchronization signal in a different communication (e.g., LTE communication performed on an unlicensed band). And, a sequence may indicate that a UE, which has transmitted the sequence, corresponds to an LTE UE. When LTE communication is performed on an unlicensed band, it may correspond to communication performed with a UE performing a different communication scheme (e.g., 802.11 system). In particular, the abovementioned description can be used for performing communication with a device of a different communication scheme. In this case, although the communication is used for transmitting and receiving a signal with each other, the communication can also be used for transmitting and receiving a specific signal to check the existence of a partner device. In particular, UEs of a different communication scheme are able to know whether or not an LTE UE exist based on a synchronization signal configuration scheme proposed in the present invention. The synchronization signal configuration scheme can be differently configured depending on a band or an LTE service. To this end, the UEs of the different communication scheme can be equipped with a device, a circuit, or a module for detecting all or a part of synchronization signals proposed by the present invention.

Meanwhile, in the embodiments 1 and 2, it may also consider a method of transmitting a full band (a method of filling a full band with the same sequence or a method of filling a full band by inserting null between REs). When a synchronization signal is transmitted, if the remaining RE is not used by a different UE, it may be able to enhance resolution in time domain by transmitting a full band.

Embodiments Related to Repetition Factor

Following description relates to a method of configuring the repetition factor mentioned earlier in the embodiments 1 and 2.

A repetition factor is configured by a network or can be differently configured according to mobility of a UE. In this case, a repetition factor of V-SS can be differently configured according to a resource region in which the V-SS is transmitted. For example, a repetition factor can be configured in proportion to a moving speed of a UE. If the UE moves with a speed equal to or greater than a prescribed threshold, it may configure a repetition factor of V-SS to be big to make the repetition factor robust to a frequency shift due to the Doppler Effect. As a different example, if an RSU or an eNB positioned on a road knows or estimates an average moving speed of the road, the RSU or the eNB configures a repetition factor of V-SS on the road and signals the repetition factor to a vehicle UE (V-UE) or a pedestrian UE (P-UE) via physical layer signaling or higher layer signaling. Having received the repetition factor, the V-UE or the P-UE can perform a transmission/reception operation of the V-SS in consideration of the signaled repetition factor.

A repetition factor can be configured according to a frequency of a carrier on which a sequence is transmitted. In particular, a repetition factor of a V-SS transmitted by a V-UE can be differently configured according to a carrier frequency on which the V-SS is transmitted. For example, when a V-SS is transmitted on 5.9 GHz, the V-SS is transmitted by configuring a repetition factor with a big value. On the contrary, when a V-SS is transmitted on an LTE carrier equal to or narrower than 3 GHz, the V-SS can be transmitted by configuring a repetition factor with a small value. Since a frequency error requirement is configured in a unit of PPM on the basis of a carrier frequency, if the carrier frequency is big, an absolute frequency offset increases. Hence, if a repetition factor is configured to big on a carrier of a high frequency band, it may be able to effectively handle the increase of the frequency offset.

It may be able to differently configure all or a part of IDs of a root sequence/SSSS of a repetition factor/PSSS according to a type of a UE transmitting or receiving a V-SS. For example, when a P-UE transmits a V-SS, a repetition factor transmitted by the P-UE can be configured to be smaller than a repetition factor transmitted by a V-UE. This is because, since mobility of the P-UE is not that big, Doppler shift occurs less frequently between V-UEs. Or, if a UE receiving a V-SS corresponds to a P-UE (when a V-UE transmits a V-SS for a P-UE, a position of a subframe in which the V-SS is transmitted can be signaled to the P-UE and the V-UE or can be determined in advance.), a repetition factor can be configured to be smaller than the V-SS transmitted to the V-UE. As an extreme case, when a V-UE performs transmission for a P-UE, the V-UE can perform the transmission using a repetition factor identical to an SLSS.

In a V-SS, similar to an SLSS, an SSSS is not transmitted, the very limited number of SSSS is transmitted, or an SSSS of a sequence different from a sequence of an SLSS can be used. Basically, since a V-UE matches synchronization with a GPS, it is highly probable that most of V-UEs have the same timing. In particular, since a separate synchronization cluster is generated, the necessity for identifying the synchronization cluster is reduced. As a result, the number of SSSS is reduced or the SSSS is not transmitted. For example, a VSSS used by a V-UE may use a scheme of performing transmission in a 5th subframe in an SSS (secondary synchronization signal) used in LTE. This is because, since an SSS of an SLSS uses an SSS of a 0th subframe, it is necessary to distinguish the SSS from a sequence used in the SLSS. For the similar reason, the PSSS may also use a single root sequence only. If multiple PSSSs are used, it may be able to configure a root sequence of the PSSSs to be differently used according to whether or not a GPS synchronization signal is successfully received. For example, if V-UEs successfully match synchronization with a GPS, the V-UEs may use a root sequence A. If UEs fail to match synchronization with the GPS, it may determine a rule that the UEs use (transmit) a PSSS of a root sequence B. The abovementioned embodiments can be determined in advance or can be differently configured according to a carrier frequency on which a V-SS is transmitted. If SSSS is not transmitted, a corresponding RE can be used by PSBCH. If the SSSS is used, it may perform rate matching on a position of the SSSS.

In V-SS, it may or may not transmit PSBCH. If the PSBCH is transmitted, it may be able to define PSBCH of a new format. If a legacy PSBCH is reused, a partial field of the legacy PSBCH can be used as a virtual CRC without being used. For example, among the fields of the PSBCH, a TDD configuration field and a bandwidth field may not be used for a V2X dedicated carrier. In case of a DFN (D2D frame number) field, if a GPS received UE assumes that a clock drift is not big, the DFN field may not be used. If a V-SS is transmitted to a UE, which has fails to receive a GPS, the DFN can be transmitted via the PSBCH. This scheme helps the UE, which has failed to receive a GPS, to receive a V-SS and configure the DFN.

A repetition factor can be configured according to whether or not a UE receiving a sequence is connected with a GPS. All or a part of a repetition factor, a root sequence of a PSSS, and an ID of an SSS can be differently configured according to whether or not a GPS signal is successfully received or an assumption that a UE fails to receive a GPS signal. And, an SLSS ID represented by a combination of the root sequence of the PSSS and the ID of the SSSS can be differently configured for UEs, which have successfully receives a GPS signal, or UEs using the GPS as a reference of time synchronization. For example, a specific SLSS ID can be determined in advance or can be signaled by a network for the UEs. If it is assumed that frequency synchronization of the GPS is used for transmitting and receiving a V-SS, a frequency offset may differently occurs according to whether or not the GPS is connected. Yet, since the frequency offset corresponds to a relative thing between UEs, if either a Tx UE or an Rx UE fails to receive GPS, it is necessary to consider a possibility that the frequency offset increases. In particular, although the Tx UE is connected with the GPS, if a UE receiving a V-SS transmitted by the Tx UE corresponds to a UE, which has failed to connect to the GPS (or, if it is able to estimate that the UE is not connected with the GPS), it may configure a repetition factor to be big and transmit the repetition factor.

All or a part of the proposed schemes can be applied not only to a V-SS but also to an RS transmitted by a V-UE. For example, it may be able to differently configure a repetition factor of an RS and/or data according to a carrier on which the RS is transmitted, mobility/lane/heading, or a type of a Tx/Rx UE.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 15:
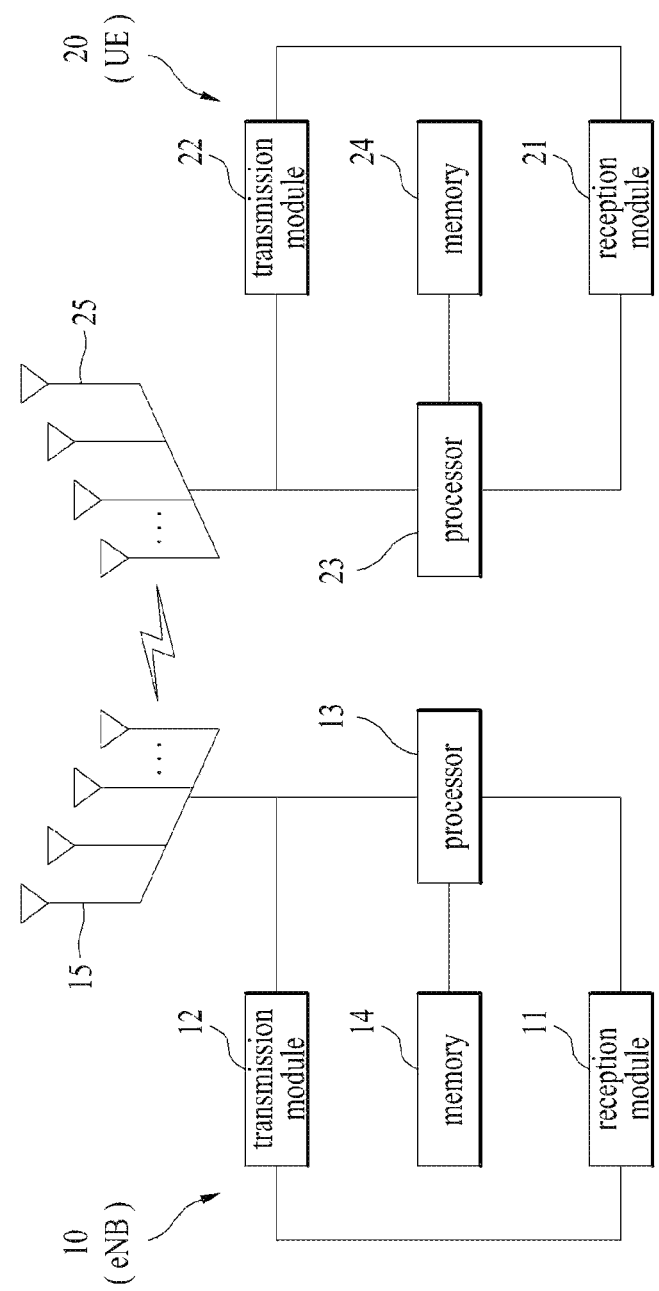
FIG. 15 is a diagram for configurations of a transmitter and a receiver.

FIG. 15 is a diagram for configurations of a transmitter and a receiver.

Referring to FIG. 15, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 15, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 15 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a synchronization signal in a wireless communication system, the method comprising:
    generating a secondary synchronization signal; and
    transmitting the generated secondary synchronization signal,
    wherein the secondary synchronization signal is transmitted only in subframe 5 among subframe 0 to subframe 9, when the secondary synchronization signal is transmitted by a V-UE (vehicle user equipment), and
    wherein the secondary synchronization signal is transmitted only in the subframe 0 among the subframe 0 to the subframe 9, when the secondary synchronization signal is transmitted by a D2D (Device-to-Device) UE.

2. A user equipment (UE) for transmitting a synchronization signal in a wireless communication system, the UE comprising:
    a transmitter and a receiver; and
    a processor operatively coupled with the transmitter and the receiver, the processor configured to generate a secondary synchronization signal, and to transmit the generated secondary synchronization signal,
    wherein the secondary synchronization signal is transmitted only in subframe 5 among subframe 0 to subframe 9, when the secondary synchronization signal is transmitted by a V-UE (vehicle UE), and wherein the secondary synchronization signal is transmitted only in the subframe 0 among the subframe 0 to the subframe 9, when the secondary synchronization signal is transmitted by a D2D (Device-to-Device) UE.

* * * * *